(12) United States Patent
Hargreaves

(10) Patent No.: US 10,055,045 B2
(45) Date of Patent: Aug. 21, 2018

(54) CURRENT FEEDBACK DIGITAL CHARGE ACCUMULATOR

(71) Applicant: Synaptics Incorporated, San Jose, CA (US)

(72) Inventor: Kirk Hargreaves, Mountain View, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 105 days.

(21) Appl. No.: 14/292,842

(22) Filed: May 31, 2014

(65) Prior Publication Data

US 2015/0346896 A1 Dec. 3, 2015

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ............ G06F 19/00; G06F 3/044; G09G 3/30
See application file for complete search history.

(56) References Cited

U.S. PATENT DOCUMENTS

| | | | |
|---|---|---|---|
| 7,777,501 B2 | 8/2010 | Reynolds et al. | |
| 7,902,842 B2 | 3/2011 | Reynolds et al. | |
| 7,977,954 B2 | 7/2011 | Reynolds et al. | |
| 8,305,304 B2 | 11/2012 | Kimura | |
| 8,481,873 B2 | 7/2013 | Osoinach et al. | |
| 8,493,358 B2 | 7/2013 | Rebeschi et al. | |
| 8,542,215 B2 | 9/2013 | Hanauer et al. | |
| 2007/0075710 A1* | 4/2007 | Hargreaves | ........ G01R 27/2605 324/658 |
| 2008/0061800 A1* | 3/2008 | Reynolds | ........... G01R 27/2605 324/678 |
| 2008/0116904 A1* | 5/2008 | Reynolds | ............... G06F 3/0416 324/678 |
| 2009/0303198 A1* | 12/2009 | Yilmaz | ............ H03K 17/9622 345/173 |
| 2012/0113047 A1 | 5/2012 | Hanauer et al. | |
| 2013/0262004 A1 | 10/2013 | Hargreaves | |
| 2013/0321001 A1 | 12/2013 | Hargreaves | |
| 2013/0321005 A1 | 12/2013 | Hargreaves | |

* cited by examiner

*Primary Examiner* — Andrew Sasinowski
(74) *Attorney, Agent, or Firm* — Patterson + Sheridan, LLP

(57) ABSTRACT

Embodiments of the present invention generally provide a method of input sensing with a sensor electrode. The method includes driving an input sensing signal to charge the sensor electrode and sampling a first voltage associated with the sensor electrode. The method further includes removing charge from the sensor electrode when the first voltage is above a threshold voltage, adding charge to the sensor electrode when the first voltage is below the threshold voltage, determining a number of times charge is removed from the sensor electrode, and determining a number of times charge is added to the sensor electrode. The method further includes determining positional information based on the number of times charge is removed from the sensor electrode and the number of times charge is added to the sensor electrode.

19 Claims, 12 Drawing Sheets

CURRENT FEEDBACK DIGITAL CHARGE ACCUMULATOR

BACKGROUND OF THE INVENTION

1. Field of the Invention

Embodiments of the present invention generally relate to a current feedback digital charge accumulator for an input device.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems, such as touchpads integrated in, or peripheral to, notebook or desktop computers. Proximity sensor devices are also often used in smaller computing systems, such as touch screens integrated in cellular phones or tablet computers.

Proximity sensor devices may include one or more types of electrodes configured for transmitting and/or receiving input sensing signals. When performing input sensing, signals are typically first acquired in the analog domain. Various types of processing may then be performed with the analog signals prior to converting the signals into the digital domain. However, processing input sensing signals using analog circuitry generally requires larger components, such as large capacitors and/or resistors. In addition, as the feature size of proximity sensor devices is decreased, the size of the analog circuitry generally must be increased.

Accordingly, there is a need for reducing the number of analog components needed to perform input sensing in proximity sensor devices.

SUMMARY OF THE INVENTION

Embodiments of the present invention generally provide a method of input sensing with a sensor electrode. The method includes driving an input sensing signal to charge the sensor electrode and sampling a first voltage associated with the sensor electrode. The method further includes removing charge from the sensor electrode when the first voltage is above a threshold voltage, adding charge to the sensor electrode when the first voltage is below the threshold voltage, determining a number of times charge is removed from the sensor electrode, and determining a number of times charge is added to the sensor electrode. The method further includes determining positional information based on the number of times charge is removed from the sensor electrode and the number of times charge is added to the sensor electrode.

Embodiments of the present invention may further provide a processing system for an input device. The processing system includes a driver module having driver circuitry and configured for driving an input sensing signal to charge a sensor electrode. The processing system further includes a feedback circuit configured for coupling to the sensor electrode. The feedback circuit is further configured for sampling a first voltage associated with the sensor electrode, removing charge from the sensor electrode when the first voltage is above a threshold voltage, and adding charge to the sensor electrode when the first voltage is below the threshold voltage. The processing system further includes a determination module configured for determining a number of times charge is removed from the sensor electrode, determining a number of times charge is added to the sensor electrode, and determining positional information based on the number of times charge is removed from the sensor electrode and the number of times charge is added to the sensor electrode.

Embodiments of the present invention may further provide an input device including a sensor electrode and a processing system coupled to the sensor electrode. The processing system is configured to drive an input sensing signal to charge the sensor electrode, sample a first voltage associated with the sensor electrode, remove charge from the sensor electrode when the first voltage is above a threshold voltage, and add charge to the sensor electrode when the first voltage is below the threshold voltage. The processing system is further configured to determine a number of times charge is removed from the sensor electrode, determine a number of times charge is added to the sensor electrode, and determine positional information based on a number of times charge is removed from the sensor electrode and a number of times charge is added to the sensor electrode.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a method and system for converting input sensing signals received by one or more sensor electrodes from the analog domain to the digital domain. In some embodiments, a feedback circuit is configured to sample a voltage associated with a sensor electrode and, based on the voltage, add charge to or remove charge from the sensor electrode. The presence or position of an input object is then determined based on the number of times charge is added to the sensor electrode and/or removed from the sensor electrode. Advantageously, the method and system described herein enable input sensing signals to be converted into the digital domain shortly after such signals are received from the sensor electrodes, reducing the number and size of analog circuitry included in the input device.

Figure 1:
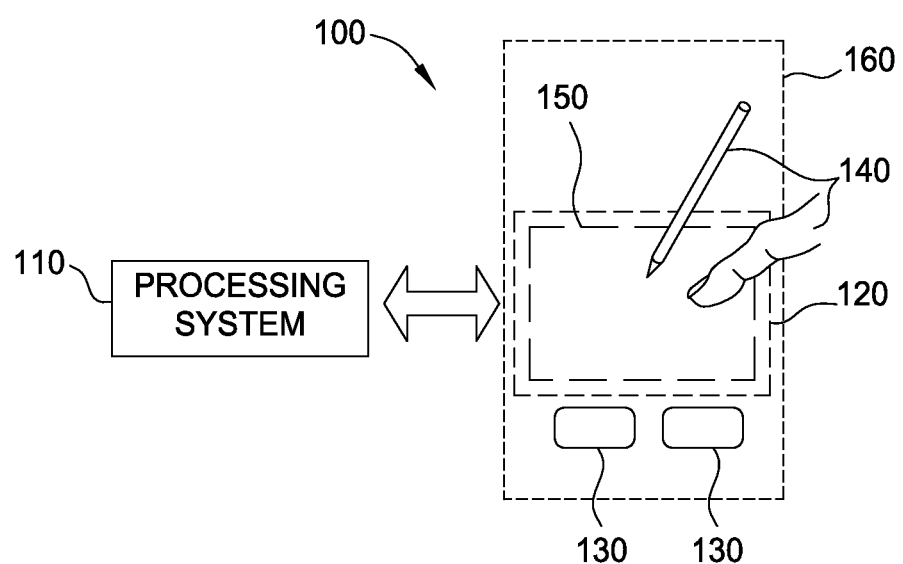
FIG. 1 is a block diagram of an exemplary input device in accordance with embodiments of the invention.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include the input device 100 and separate joysticks or key switches. Further exemplary electronic systems include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones) and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include I²C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Examples of input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some capacitive implementations of the input device 100, voltage or current is applied to create an electric field. Nearby input objects 140 cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In some touch screen embodiments, transmitter electrodes comprise one or more common electrodes (e.g., "V-com electrode") used in updating the display (e.g., display lines) of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In various embodiments, two or more transmitter electrodes may share one or more common electrodes. In addition, other display elements, such as source drivers, gate select lines, storage capacitors, and the like, may be used to perform capacitive sensing.

In other touch screen embodiments, the sensing elements 150 may be formed as discrete geometric forms, polygons, bars, pads, lines, or other shapes that are ohmically isolated from one another. When formed as discrete geometric elements, the sensing elements 150 may be driven using absolute sensing and/or transcapacitance sensing methods. The sensing elements 150 may be electrically coupled through circuitry to form electrodes of having larger plan area relative to the individual sensing elements 150. The sensing elements 150 may be formed as a contiguous body of conductive material having little or no open area (i.e., having a planar surface uninterrupted by holes) or may alternatively be fabricated to form a body of material having openings formed therethrough. For example, the sensing elements 150 may be formed from a mesh of conductive material, such as a plurality of interconnected thin metal wires. Additionally, the sensing electrodes 150 may include a grid electrode. The grid electrode may be disposed between at least two discrete sensing elements 150 and/or may at least partially circumscribe one or more discrete sensing elements 150. In some embodiments, the grid electrode may be a planar body having a plurality of apertures, where each aperture circumscribes a discrete sensing element 150. The grid electrode may also be segmented.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and the like. In some embodiments, components of the processing system 110 are located together, such as near sensing element(s) of the input device 100. In other embodiments, components of processing system 110 are physically separate from one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As one example, a common electrode may be utilized to update a display line during a display update period and utilized to perform input sensing during a non-display period. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
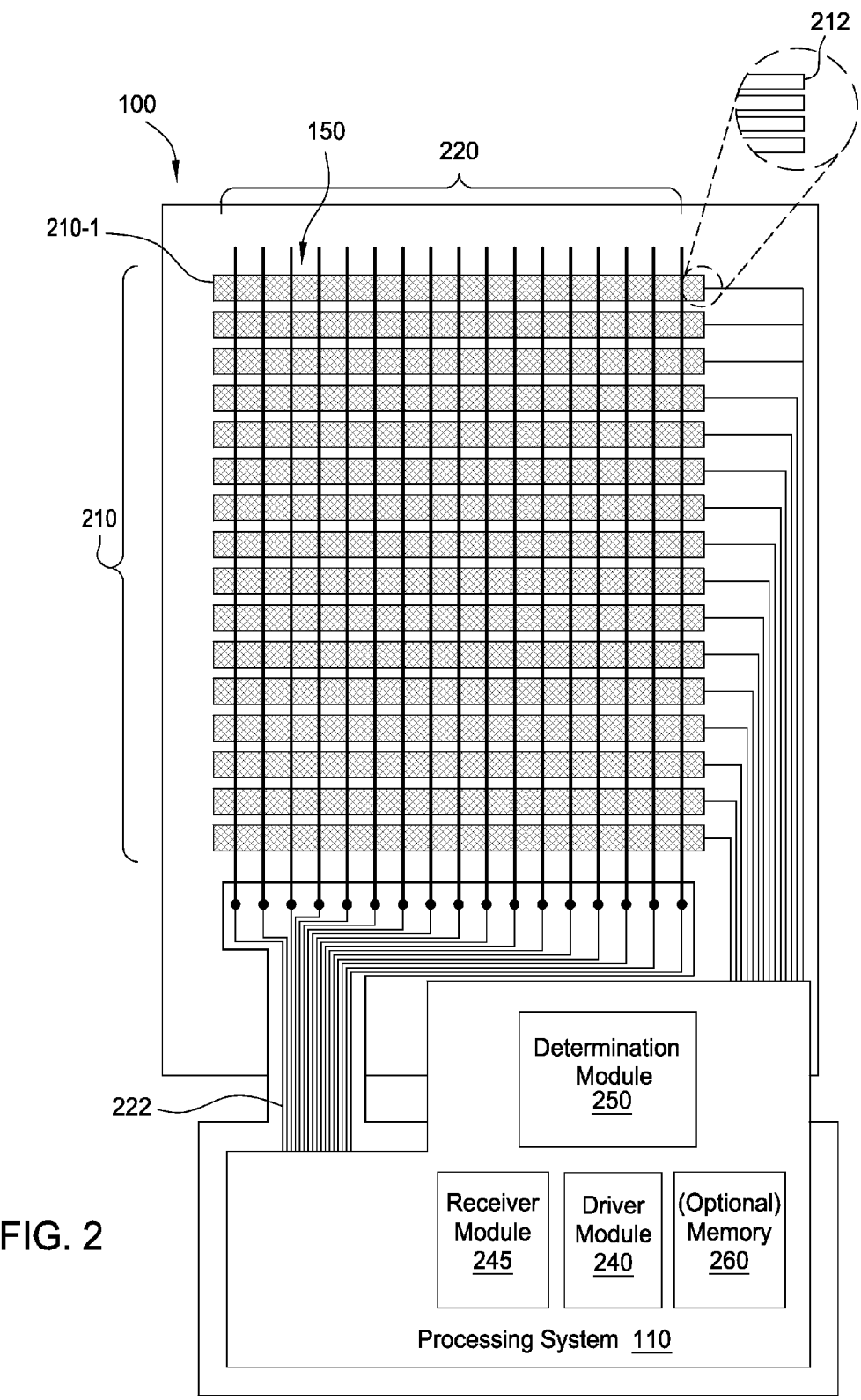
FIG. 2 is a partial schematic plan view of the input device of FIG. 1 in accordance with embodiments of the invention.

FIG. 2 is a partial schematic plan view of the input device 100 of FIG. 1 in accordance with embodiments of the invention. The input device 100 includes an array of sensing elements 150 and processing system 110. The array of sensing elements 150 includes a plurality of transmitter electrodes 210 (e.g., 210-1, 210-2, 210-3, etc.) and a plurality of receiver electrodes 220 (e.g., 220-1, 220-2, 220-3, etc.). Each transmitter electrode 210 may comprise one or more common electrodes 212. Although the transmitter electrodes 210 and receiver electrodes 220 are illustrated as being rectangular, in other embodiments, the transmitter electrodes 210 and receiver electrodes 220 may be any practical geometric shape. Additionally, in various embodiments, each receiver electrode 220 may comprise one or more common electrodes. The processing system 110 is coupled to the array of sensing elements 150, for example, through one or more routing traces 222.

The sensing elements 150 may be formed on a substrate that is external to the display device 160. For example, the receiver electrodes 220 may be disposed on the outer surface of a lens of the input device 100, between the color filter glass of the display device 160 and the lens of the input device 100, or between a thin film transistor substrate (TFT substrate) and the color filter glass of the display device 160. In such embodiments, the transmitter electrodes 210 may include one or more common electrodes 212, such as one or more segments of a Vcom electrode, a source line, gate line, an anode sub-pixel electrode, cathode pixel electrode, or any other display element that is used for both display updating and input sensing. In other embodiments, both the transmitter electrodes 210 and the receiver electrodes 220 include one or more common electrodes 212, such as common electrodes disposed on the TFT substrate and/or color filter glass.

Although the processing system 110 is illustrated in FIG. 2 embodied as a single integrated circuit (IC) (e.g., an integrated controller), the processing system 110 may include any appropriate number of ICs. As shown in FIG. 2, the processing system 110 may include a driver module 240, a receiver module 245, a determination module 250, an optional memory 260, and/or a synchronization mechanism (not shown in FIG. 2).

The driver module 240 includes driver circuitry and may be configured for updating images on the display screen of the display device 160. For example, the driver circuitry may be configured to apply one or more pixel voltages to the display pixel electrodes through pixel source drivers. The driver circuitry may also be configured to apply one or more common drive voltages to the common electrodes 212 to update one or more display lines of the display screen. In addition, the processing system 110 is configured to operate the common electrodes 212 as transmitter electrodes 210 for input sensing by driving transmitter signals onto the common electrodes 212.

The receiver module 245 is coupled to the plurality of receiver electrodes 220 and configured to receive resulting signals from the receiver electrodes 220 indicative of input (or lack of input) in the sensing region 120 and/or of environmental interference. The receiver module 245 may also be configured to pass the resulting signals to the determination module 250 for determining the presence of an input object and/or to the optional memory 260 for storage. In some embodiments, the receiver module 245 is configured to receive resulting signals while the processing system 110 is not actively transmitting input sensing signals with the transmitter electrodes 210. For example, during such time periods, the receiver electrodes 220 may be configured to receive noise (e.g., to determine a baseline interference value) and/or a signal from an active input object 140 capable of transmitting a transmitter signal, such as an active pen capable of transmitting an active pen signal. Additionally, the receiver module 245 and/or driver module 240 may be configured to drive a modulated signal onto the at least one sensing element 150 to detect changes in absolute capacitance between the at least one sensor electrode and an input object 140. The receiver module 245 may include various types of circuitry, such as a feedback circuit and/or a dither circuit, for receiving and processing resulting signals.

The functions of the processing system 110 may be implemented in more than one IC to control the display device 160 elements (e.g., common electrodes 212) and drive transmitter signals and/or receive resulting signals received from the array of sensing elements 150. For example, one IC may be configured to perform input sensing and another IC may be configured to perform display updating. In other embodiments, one IC may be configured to perform the functions of the driver module 240, and another IC may be configured to perform the functions of the receiver module 245. In embodiments where there is more than one IC, communications between separate ICs of the processing system 110 may be achieved through a synchronization mechanism, which sequences the signals provided to the common electrodes. Alternatively the synchronization mechanism may be internal to any one of the ICs.

Transmitter electrodes 210 and receiver electrodes 220 are ohmically isolated from each other by one or more insulators which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below. In still other configurations, the transmitter electrodes 210 and the receiver electrodes 220 are optionally disposed on a single layer of the input device 100.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220. In other embodiments, such as embodiments that include matrix sensors, the term "capacitive pixels" may refer to the localized capacitance (e.g., absolute capacitance) between a sensing element 150 and an input object 140.

In some embodiments, the sensor pattern is "scanned" to determine these capacitive couplings. That is, the transmitter electrodes 210 are driven to transmit transmitter signals. Transmitters may be operated such that one transmitter electrode 210 transmits at one time, or multiple transmitter electrodes 210 transmit at the same time. Where multiple transmitter electrodes 210 transmit simultaneously, these multiple transmitter electrodes 210 may transmit the same transmitter signal and effectively produce an effectively larger transmitter electrode 210, or these multiple transmitter electrodes 210 may transmit different transmitter signals. For example, multiple transmitter electrodes 210 may transmit different transmitter signals according to one or more coding schemes that enable their combined effects on the resulting signals of receiver electrodes 220 to be independently determined. Additionally, in embodiments that implement matrix sensing techniques, the sensing elements 150 may be scanned to sense changes to absolute capacitance on the electrodes.

The receiver electrodes 220 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Current Feedback Digital Charge Accumulator

In various embodiments, input sensing signals (e.g., resulting signals) received by the sensor electrodes (e.g., receiver electrodes 220) may be converted into the digital domain shortly after being transmitted to the processing system 110. By converting input sensing signals into the digital domain shortly after receipt, the number and size of analog components included in the input device 100 may be reduced. Accordingly, smaller form factors may be implemented, and device costs may be reduced. Various techniques for converting input sensing signals into the digital domain are described below in conjunction with FIGS. 3-12.

Figure 3:
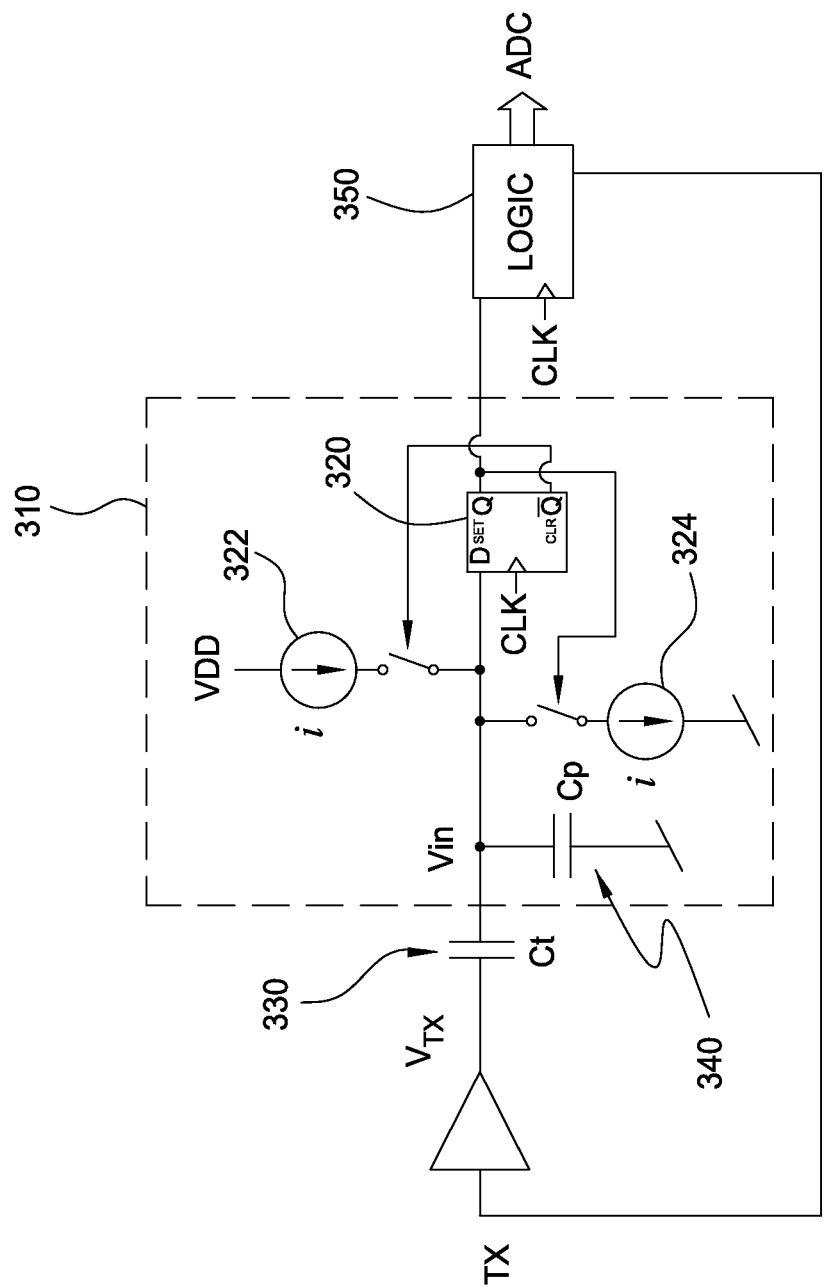
FIG. 3 is a partial schematic view of a feedback circuit included in the processing system of FIG. 1 in accordance with embodiments of the invention.

FIG. 3 is a partial schematic view of a feedback circuit 310 included in the processing system 110 of FIG. 1 in accordance with embodiments of the invention. In some embodiments, the feedback circuit 310 includes a flip-flop 320, a current source 322, and a current drain 324. The feedback circuit 310 may be coupled to one or more capacitances that apply an input voltage ($V_{IN}$) to the feedback circuit 310. The output of the feedback circuit 310 may be coupled to a logic unit 350 that processes signals received from the feedback circuit 310 to generate digital signals indicative of the presence or position of an input object 140 in the sensing region 120.

In operation, the processing system 110 (e.g., logic unit 350) causes an input sensing signal ($V_{TX}$) to be transmitted, causing charge to accumulate on one or more sensor electrodes coupled to the input of the feedback circuit 310. For example, in the transcapacitive sensing configuration shown in FIG. 3, the logic unit 350 may cause an input sensing signal to be transmitted by one or more transmitter electrodes 210, causing charge transfer between the transmitter electrode(s) 210 and one or more receiver electrodes 220 included in the input device 100. The transferred charge ($\Delta V_{TX} * C_T$) is then stored as a parasitic input capacitance $C_P$, generating an input voltage $V_{IN}$ at the input of the feedback circuit 310. This charging behavior is shown at time 410 in FIG. 4, which illustrates a voltage applied to the input of the feedback circuit 310 as a function of time in response to input sensing signals generated by the processing system 110, in accordance with embodiments of the invention.

After transmission of the input sensing signal, the feedback circuit 310 then drives the current source 322 or the current drain 324 until the input voltage $V_{IN}$ reaches a threshold voltage $V_T$. As shown in FIG. 3, the current source 322 or the current drain 324 may be selected by transmitting a clock signal (CLK) to a flip-flop 320 and, for each clock cycle, outputting either a charge signal or a discharge signal. More specifically, in various embodiments, a charge signal may be transmitted by the flip-flop 320 when the input voltage $V_{IN}$ is below the threshold voltage $V_T$ during a particular clock cycle, and a discharge signal may be transmitted by the flip-flop 320 when the input voltage $V_{IN}$ is above the threshold voltage $V_T$ during a particular clock cycle. In some embodiments, once the input voltage $V_{IN}$ reaches the threshold voltage $V_T$, the flip-flop 320 may alternate between the charge signal and the discharge signal, as shown at time 420 in FIG. 4.

Figure 4:
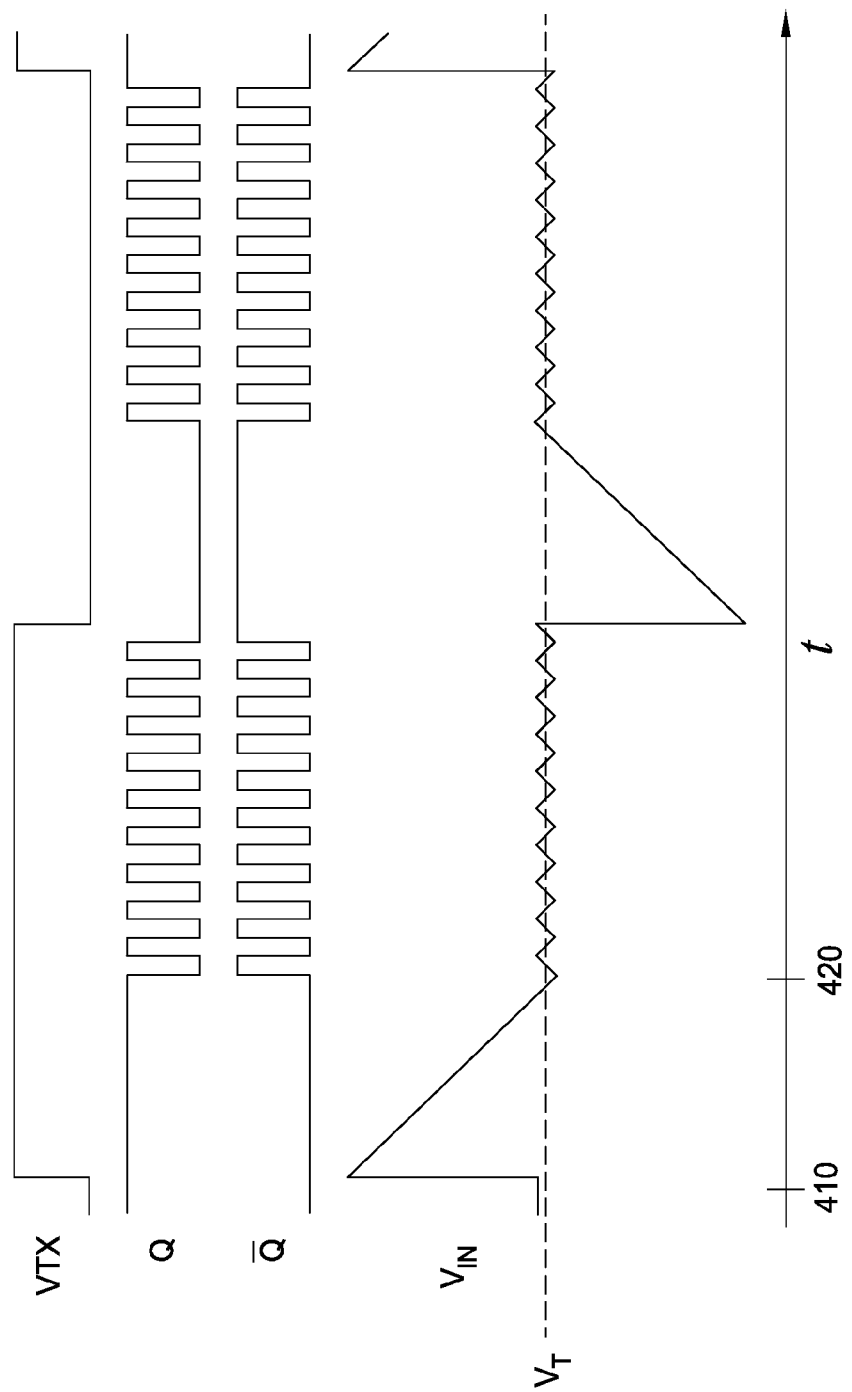
FIG. 4 illustrates a voltage applied to the input of the feedback circuit as a function of time in response to input sensing signals generated by the processing system, in accordance with embodiments of the invention.

As the input voltage $V_{IN}$ is driven towards the threshold voltage $V_T$, the logic unit 350 counts the number of charge signals and discharge signals transmitted by the flip-flop 320 and outputs the results for further processing (e.g., demodulating, filtering, etc. via the determination module 250). For example, as shown in FIG. 4, approximately 10 charge signals are transmitted by the flip-flop 320 between time 410 and time 420, after which the number of charge signals and discharge signals is substantially the same. Accordingly, the feedback circuit 310 may output a value of 10 for the first portion of the input sensing signal $V_{TX}$ shown in FIG. 4. Thus, as described above, analog signals received by the feedback circuit 310 may be converted and output as digital signals to determine the presence or position of an input object 140 in the sensing region 120.

Although FIG. 3 illustrates a transcapacitive sensing configuration, the feedback circuit 310 may also be used with absolute sensing configurations. For example, the capacitance of a sensor electrode may be modulated, and a voltage associated with the sensor electrode may be applied to the input of the feedback circuit 310. The feedback circuit 310 may then count the number of charge signals and discharge signals required to drive the input voltage $V_{IN}$ to the threshold voltage $V_T$, as described above. In some embodiments, absolute capacitance may be measured by disabling/removing the current source 322 and current drain 324 (e.g., via one or more switches) and pre-charging the input voltage $V_{IN}$ to $V_{DD}$ or ground.

Additionally, although the feedback circuit 310 illustrated in FIG. 3 includes a flip-flop 320, any type of circuit capable of providing feedback based on an input voltage may be used. For example, in some embodiments, other types of comparators or analog to digital converters (ADCs) having various precisions (e.g., 1-bit, 2-bit, 4-bit, etc.) may be used to control one or more current sources 322 and/or one or more current drains 324 in order to maintain a threshold voltage $V_T$ at the input of the feedback circuit 310.

In various embodiments, multiple current sources 322 and/or current drains 324 may be used. In some embodiments, each of the multiple current sources 322 and/or current drains 324 may provide substantially the same magnitude of electrical current. In such embodiments, more than one current source 322 or current drain 324 may be selected and combined based on the magnitude of the input voltage $V_{IN}$. For example, the output of multiple current sources 322 or current drains 324 may be combined to more rapidly converge on the threshold voltage $V_T$. Further, when multiple, substantially similar current sources 322 and/or current drains 324 are used, selection of the current sources 322 and/or current drains 324 may be randomized such that variations between the current sources 322 and/or current drains 324 cancel out over the course of multiple input sensing cycles. In other embodiments, each of the multiple current sources 322 and/or current drains 324 may provide different magnitudes of current. In any of the embodiments described above, a large current may be applied until the threshold voltage $V_T$ is crossed, after which a smaller current may be applied until the threshold voltage $V_T$ is crossed again. This process may be continued until the smallest current is selected and applied (e.g., a single current source 322 or current drain 324). In such configurations, the process of successive approximation may be used to more quickly converge on the threshold voltage $V_T$, for example, by using a power of two number of current sources 322 and/or current drains 324 (e.g., $2^N$ current sources and/or current drains).

In still other embodiments, other types of current sources and current drains may be used to maintain a threshold voltage $V_T$ at the input of a feedback circuit. Such embodiments are described below in conjunction with FIGS. 5-9.

Figure 5:
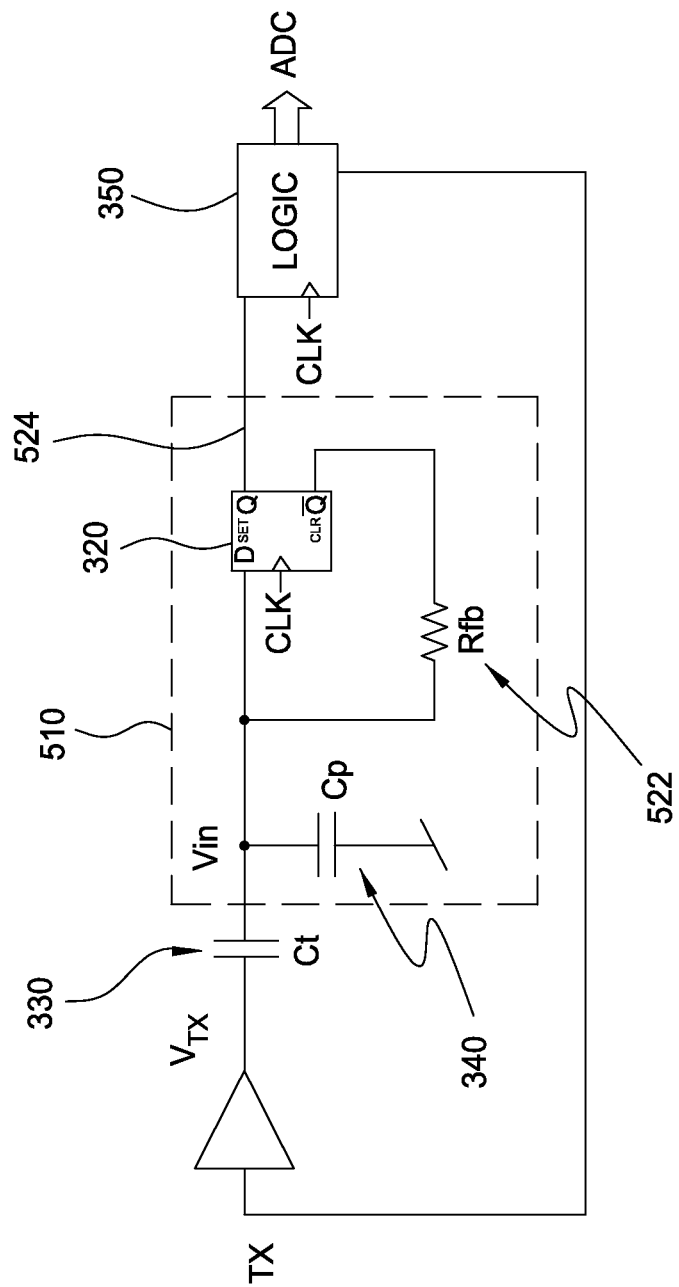
FIG. 5 is a partial schematic view of a feedback circuit in which a resistor serves as a current source in accordance with embodiments of the invention.

FIG. 5 is a partial schematic view of a feedback circuit 510 in which a resistor 522 serves as a current source, in accordance with embodiments of the invention. As shown, instead of using an active current source to control the input voltage $V_{IN}$, a resistor 522 may be coupled to the flip-flop 320 to provide a current source when a discharge signal is transmitted by the flip-flop 320. Additionally, instead of using an active current drain, current may be drained from the parasitic capacitance $C_P$ via a coupling 524, such as a coupling to the logic unit 350. In operation, a charge signal or discharge signal may be transmitted each time the flip-flop 320 is clocked until the input voltage $V_{IN}$ reaches the threshold voltage $V_T$, as described above in conjunction with FIGS. 3 and 4. The logic unit 350 may then determine a difference between the number of charge signals and the number of discharge signals transmitted by the flip-flop 320 and output the results for further processing.

Figure 6:
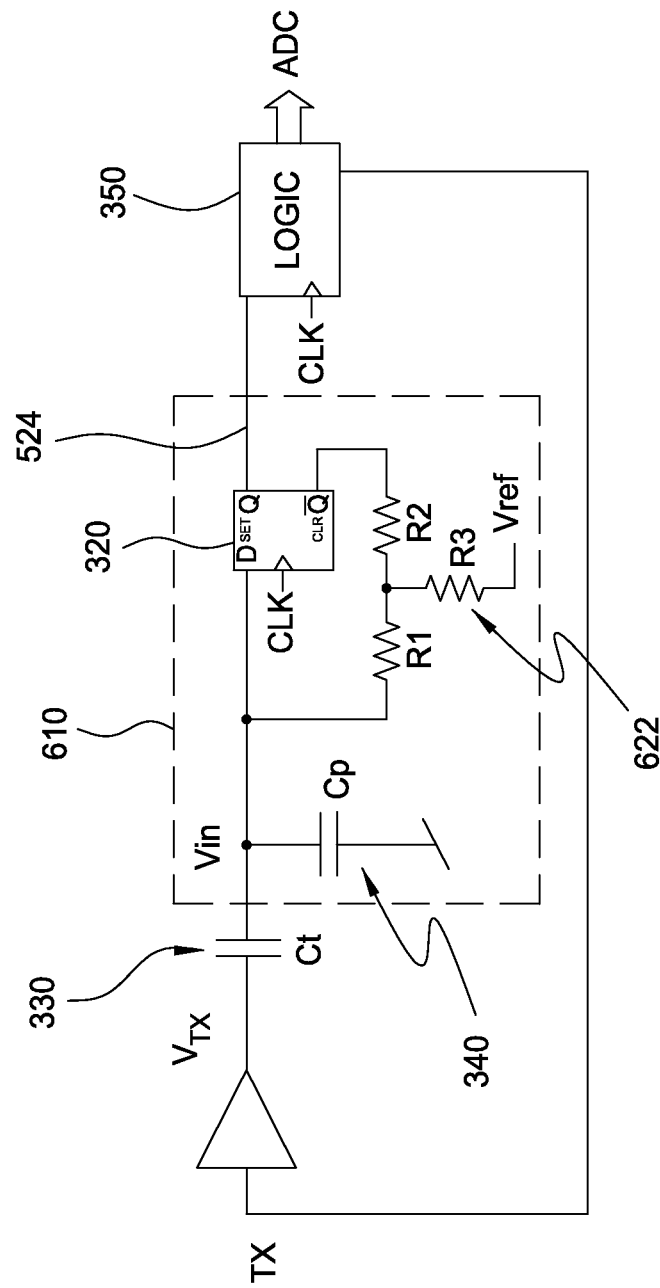
FIG. 6 is a partial schematic view of a feedback circuit in which a network of resistors serve as a current source in accordance with embodiments of the invention.

FIG. 6 is a partial schematic view of a feedback circuit 610 in which a network of resistors 622 serve as a current source, in accordance with embodiments of the invention. As shown, instead of using a single resistor, a network of resistors 622 (e.g., a "T-network") and a voltage source may be coupled to the flip-flop 320 to provide a current source to control the input voltage $V_{IN}$. Using a network of resistors 622 and a reference voltage to mimic the resistance of a larger resistance (e.g., resistor 522) may allow the size of the feedback circuit 610 to be reduced. As described above with respect to FIG. 5, in operation, a charge signal or discharge signal may be transmitted each time the flip-flop 320 is clocked until the input voltage $V_{IN}$ reaches the threshold voltage $V_T$. The results are then outputted by the feedback circuit 610.

Figure 7:
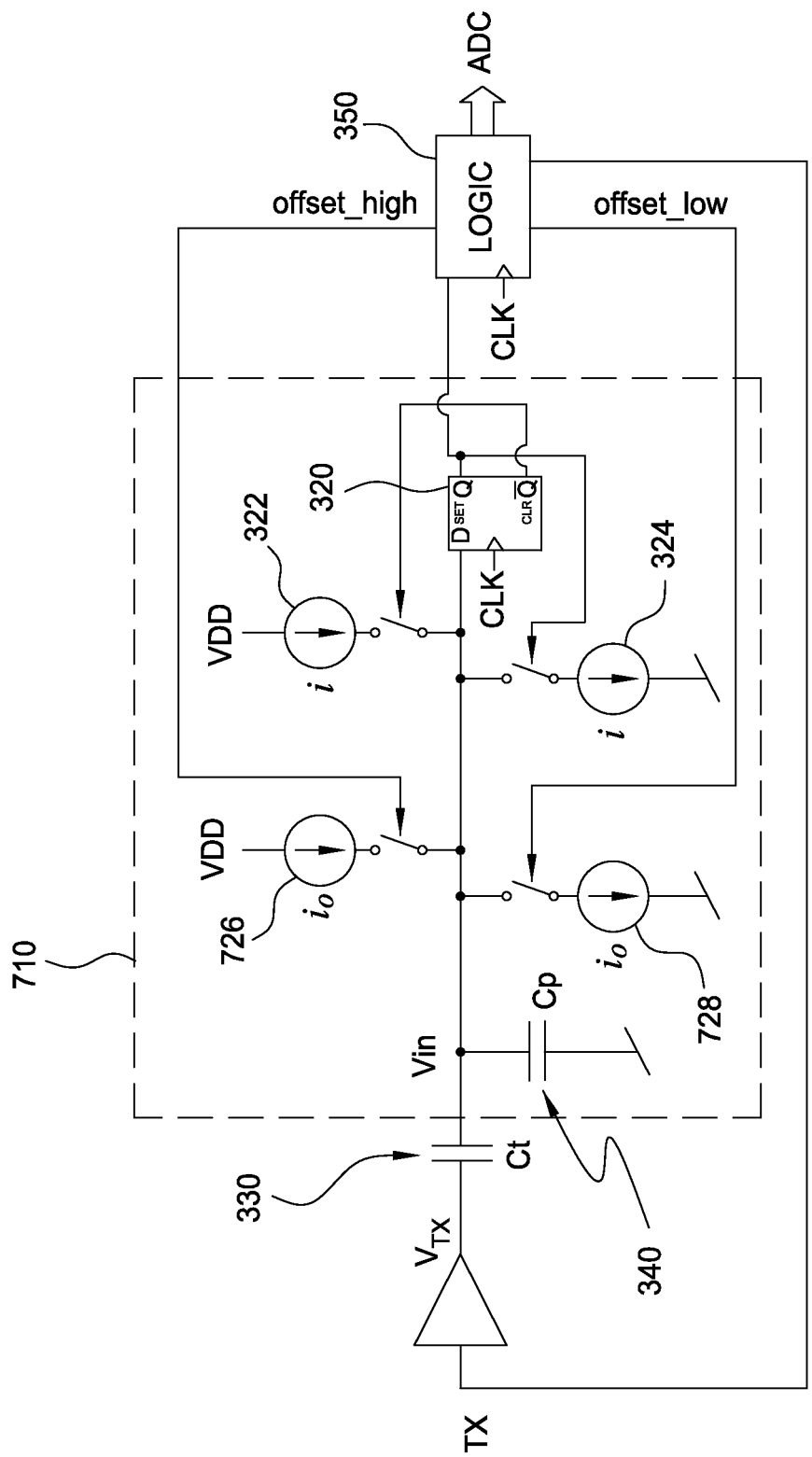
FIG. 7 is a partial schematic view of a feedback circuit configured to provide an offset current in accordance with embodiments of the invention.

FIG. 7 is a partial schematic view of a feedback circuit 710 configured to provide an offset current in accordance with embodiments of the invention. In general, the feedback circuit 710 may operate in a manner that is similar to the operation of the feedback circuit 310 illustrated in FIG. 3. However, the feedback circuit 710 includes an additional current source 726 and current drain 728 that may be configured to add or remove a substantially constant amount of charge from the parasitic capacitance $C_P$ 340 after the transmission of each input sensing signal. For example, in some embodiments, after the transmission of an input sensing signal, the parasitic capacitance $C_P$ 340 may store a baseline amount of charge that does not provide information regarding the presence or position of an input object 140 in the sensing region 120. As such, instead of incrementally adding or removing this baseline amount of charge from the parasitic capacitance $C_P$ 340 for each input sensing cycle, the baseline amount of charge may be more efficiently added or removed by the current source 726 and current drain 728. Accordingly, more time is available to measure (e.g., by adding and/or removing) the non-baseline charge stored by the parasitic capacitance $C_P$ 340, which may provide more useful information regarding the presence or position of an input object 140 in the sensing region 120. Additionally, by providing more time to add and/or remove the non-baseline charge, higher resolution sampling of the charge may be performed, such as by applying smaller current values with the current source 322 and/or current drain 324.

Figure 8:
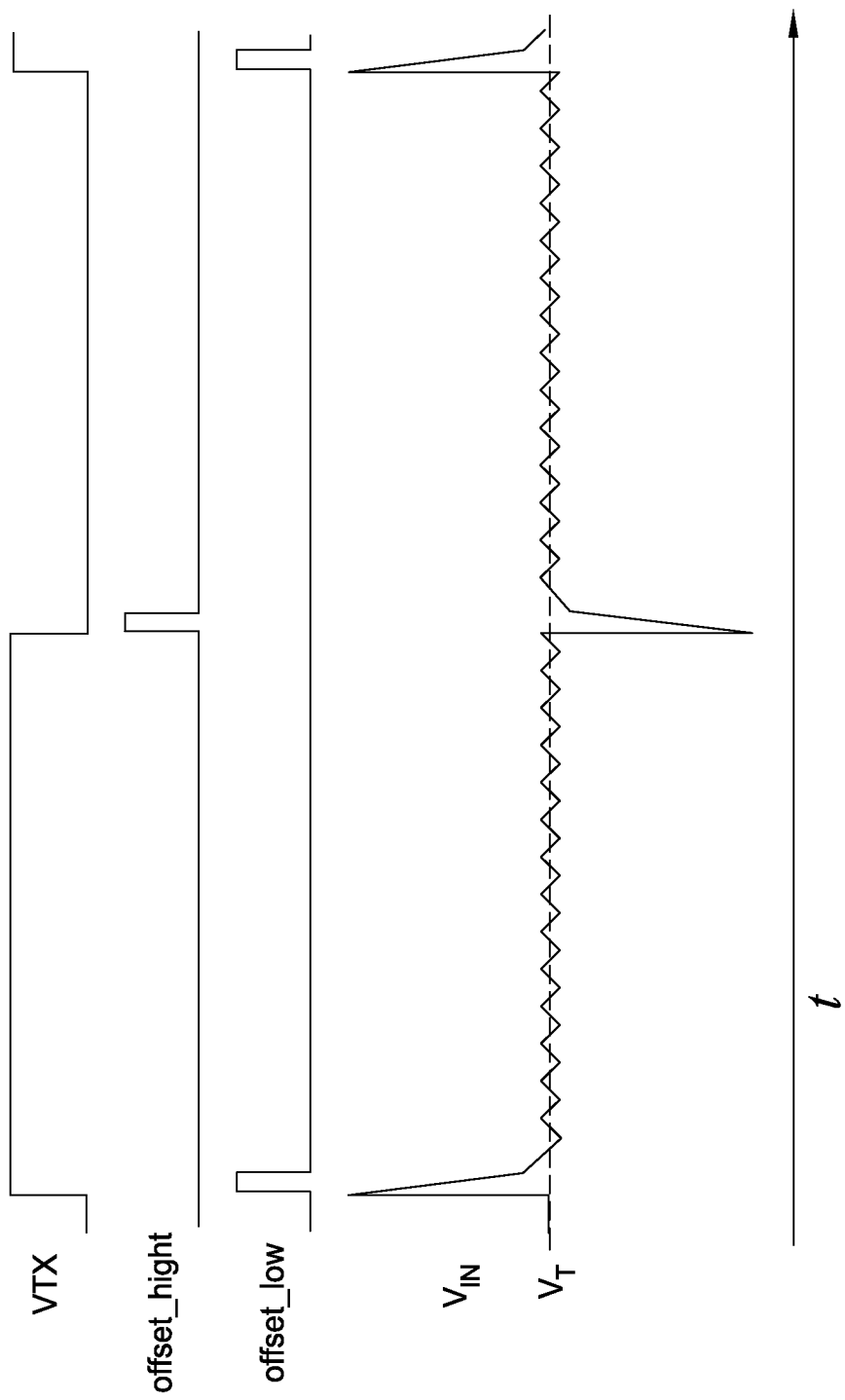
FIG. 8 illustrates a voltage applied to the input of the feedback circuit as a function of time when removing a baseline amount of charge from the parasitic capacitance $C_P$, in accordance with embodiments of the invention.

In some embodiments, the logic unit 350 causes the baseline amount of charge to be added to or removed from the parasitic capacitance $C_P$ 340. For example, the logic unit 350 may transmit an offset_high signal or an offset_low signal to the current source 726 or current drain 728, respectively, as shown in FIG. 8, which illustrates a voltage applied to the input of the feedback circuit 710 as a function of time when removing a baseline amount of charge from the parasitic capacitance $C_P$, in accordance with embodiments of the invention.

Figure 9:
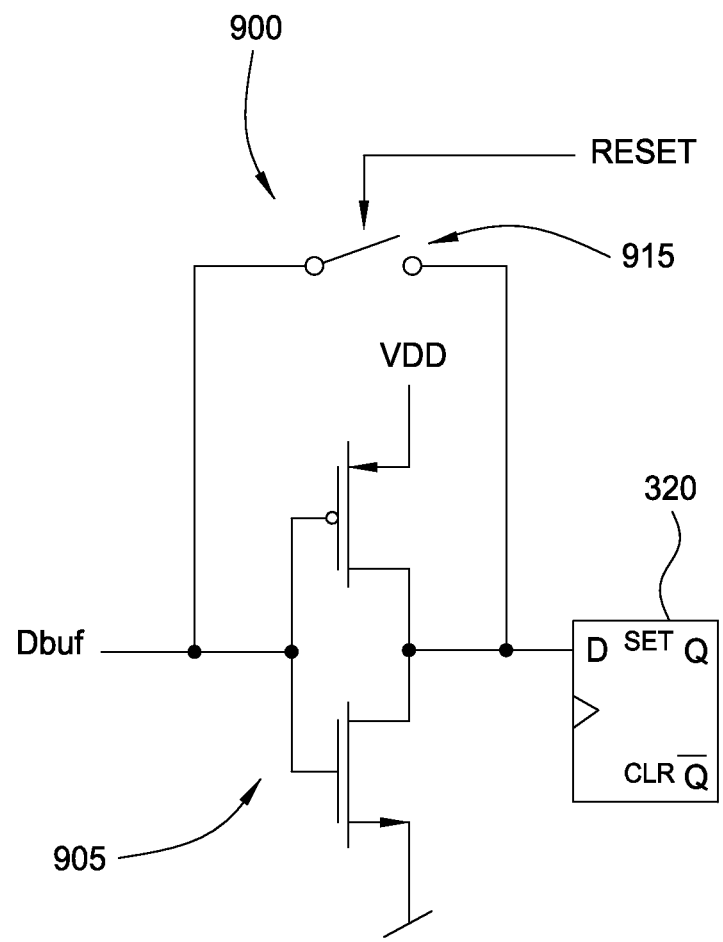
FIG. 9 is a partial schematic view of a reset circuit configured to reset a voltage associated with one or more of the feedback circuits illustrated in FIGS. 3 and 5-7, in accordance with embodiments of the invention.

FIG. 9 is a partial schematic view of a reset circuit 900 configured to reset a voltage associated with one or more of the feedback circuits illustrated in FIGS. 3 and 5-7, in accordance with embodiments of the invention. As shown, the flip-flop 320 may be buffered from the parasitic capacitance $C_P$ 340 by an inverter 905. In some embodiments, an inverter may be used to prevent current fluctuations generated by charge transfer (e.g., $\Delta V_{TX} * C_T$) from negatively affecting the flip-flop 320. In addition, such configurations may further enable the voltage at the input of the flip-flop 320 to be reset to a reference voltage (e.g., $0.5 * V_{DD}$) by shorting the parasitic capacitance $C_P$ 340 to the input of the flip-flop 320 via a reset switch 915. In some embodiments, resetting the input of the flip-flop 320 to a known value may increase noise tolerance and enable more accurate measurements to be performed when interference is received by the feedback circuit. For example, in some embodiments, a feedback circuit may be reset via the reset switch 915 once the system determines that the threshold voltage $V_T$ has been reached, such as when the flip-flop 320 is flipping back and forth between the charge signal and the discharge signal. By resetting the feedback circuit once $V_T$ has been reached, the input voltage may be held at a low impedance value, and any noise that couples to the feedback circuit prior to transmission of the next input sensing signal may be ignored.

Figure 10:
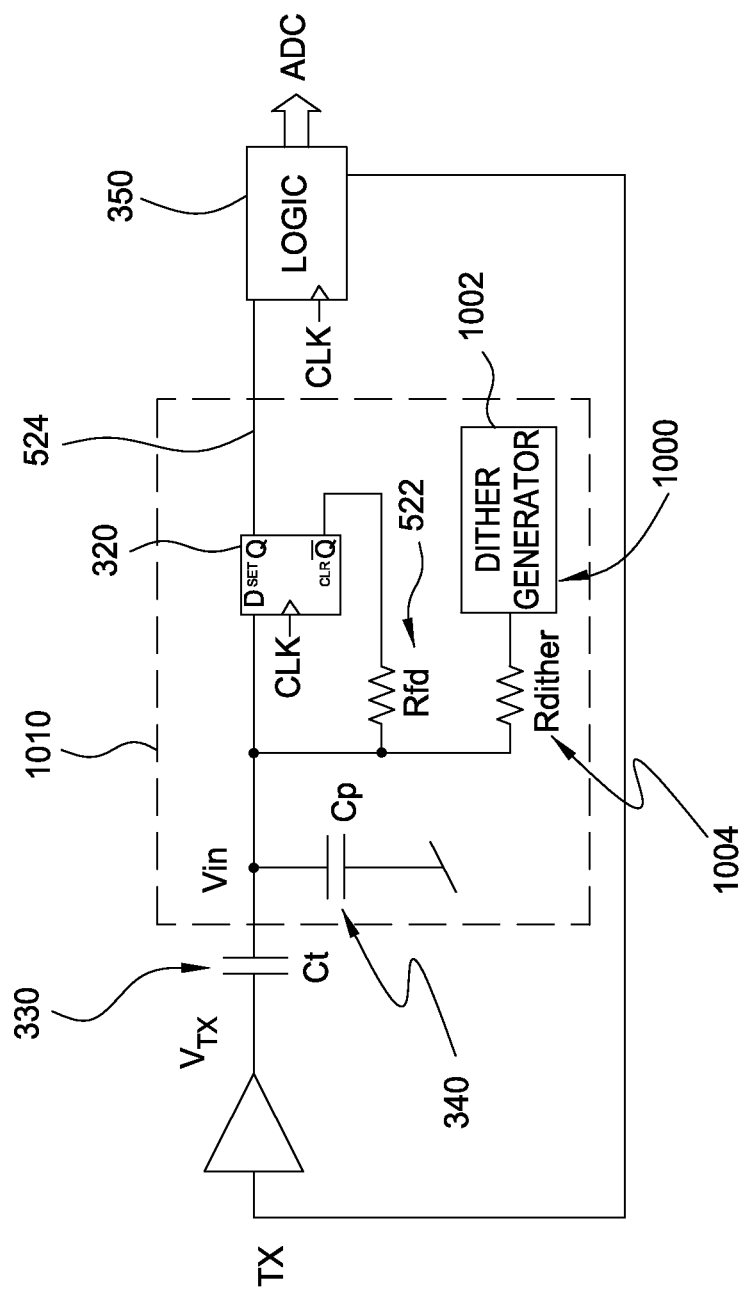
FIG. 10 is a partial schematic view of a dither circuit configured to provide a dither signal to one or more of the feedback circuits illustrated in FIGS. 3 and 5-7, in accordance with embodiments of the invention.

FIG. 10 is a partial schematic view of a dither circuit 1000 configured to provide a dither signal to one or more of the feedback circuits illustrated in FIGS. 3 and 5-7, in accordance with embodiments of the invention. As shown, the dither circuit 1000 may include a dither generator 1002 (e.g., a voltage source) and a resistor 1004. In operation, the dither circuit 1000 may transmit a dither signal to the input of the flip-flop 320 in order to add noise to the input voltage $V_{IN}$ and increase the resolution at which the input voltage $V_{IN}$ is measured.

In some embodiments, the dither signal is pseudorandom over short time scales (e.g., several input sensing cycles), and has an average magnitude of zero over longer time scales (e.g., hundreds or thousands of input sensing cycles). A zero magnitude may be achieved by using a known and repeating pseudorandom sequence. Additionally, the dither signal may be a binary dither signal (e.g., +1 and −1) or the dither signal may be a trinary dither signal (e.g., +1, 0, and −1). For example, when a trinary dither signal is implemented, the resistor 1004 may be connected to $V_{DD}$, connected to an open circuit, or connected to ground (e.g., $V_{SS}$). Additionally, any of the dithering techniques described above may be implemented using a current source and/or current drain to generate the dither signal.

In still other embodiments, dithering may be accomplished by dithering the time and state of one or more feedback signals produced by the feedback circuit 1010. An exemplary binary time dither technique is shown below in Table I, where the dither signal clock (DCLK) runs at twice the comparator (e.g., flip-flop 320) clock (CLK), such that one cycle of the DCLK is applied to the comparator feedback and the other cycle of the DCLK is applied to the dither signal.

TABLE I

| Binary time dither | | | | | | |
|---|---|---|---|---|---|---|
| Q binary | Dither binary | Q State | Dither State | Feedback State | Phase 0 Binary | Phase 1 Binary |
| 0 | 0 | +1 | −1 | 0 | 1 | 0 |
| 0 | 1 | +1 | +1 | +2 | 1 | 1 |
| 1 | 0 | −1 | −1 | −2 | 0 | 0 |
| 1 | 1 | −1 | +1 | 0 | 0 | 1 |

Figure 11:
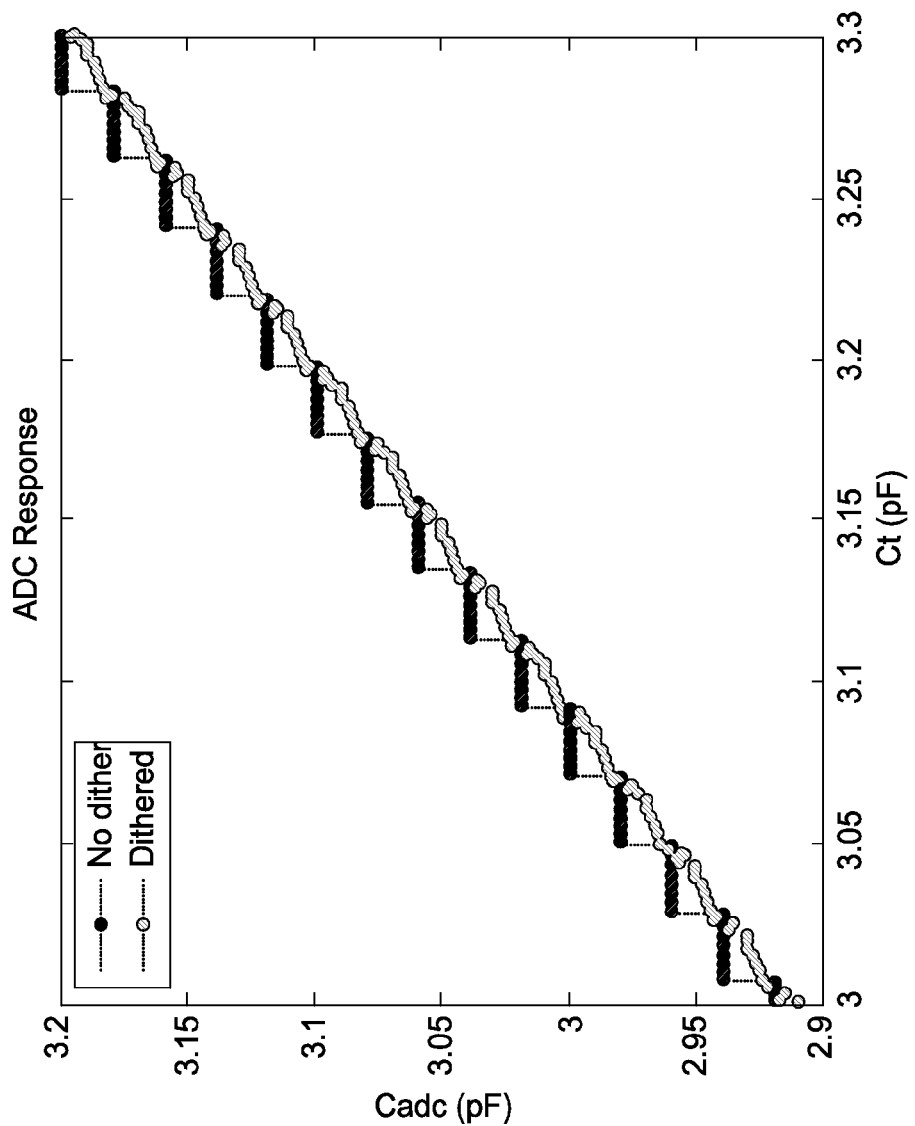
FIG. 11, which illustrates the output of the feedback circuit when adding a dither signal to the input voltage $V_{IN}$, in accordance with embodiments of the invention.

In the feedback circuit 1010 shown in FIG. 1000, adding a dither signal to the input voltage $V_{IN}$ may enable the resolution of a feedback circuit to be increased by approximately a factor of 10 over 20 input sensing cycles. Such results are shown in FIG. 11, which illustrates the output of the feedback circuit 1010 when adding a dither signal to the input voltage $V_{IN}$, in accordance with embodiments of the invention.

Figure 12:
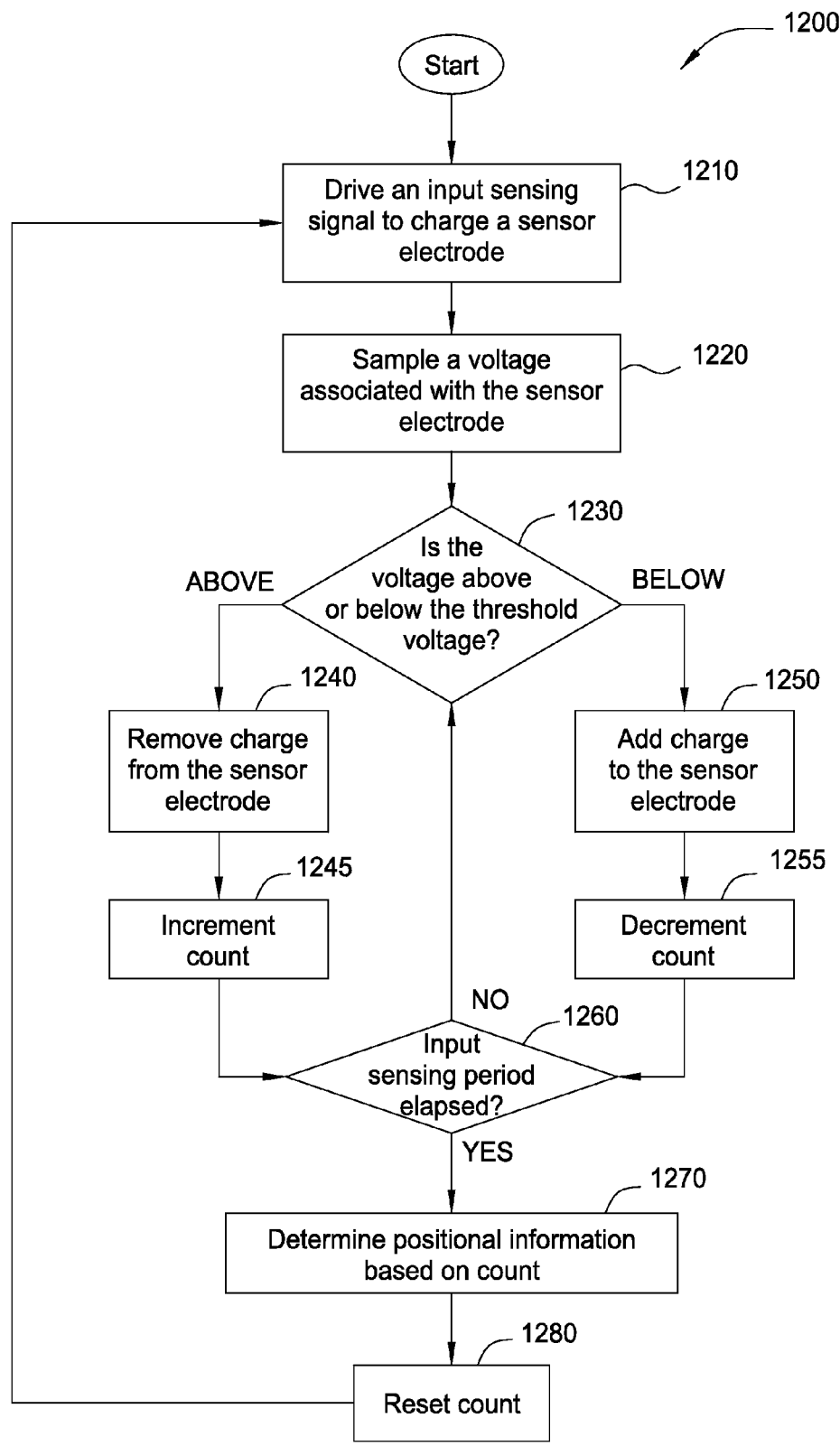
FIG. 12 is a flow chart of a method for performing input sensing using a feedback circuit included in the input device in accordance with embodiments of the invention.

FIG. 12 is a flow chart of a method 1200 for performing input sensing using a feedback circuit included in the input device 100 in accordance with embodiments of the invention. Although the method 1200 is described in conjunction with FIGS. 1-11, persons skilled in the art will understand that any system configured to perform the method, in any appropriate order, falls within the scope of the present invention.

The method 1200 begins at step 1210, where the driver module 240 drives an input sensing signal to charge a sensor electrode. In some embodiments, the sensor electrode may be a receiver electrode 220, and the input sensing signal may be transmitted via a transmitter electrode 210. In other embodiments, the sensor electrode is configured for detecting changes to absolute capacitance, and the input sensing signal is used to modulate a charge on the sensor electrode.

Next, at step 1220, a voltage associated with the sensor electrode is sampled by the feedback circuit. The feedback circuit 1230 then determines whether the voltage is above or below a threshold voltage $V_T$. If the voltage is above the threshold voltage $V_T$, then the method 1200 proceeds to step 1240, where the feedback circuit removes charge from the sensor electrode (e.g., via a current drain). Then, at step 1245, the feedback circuit causes a counter to be incremented. If the voltage is below the threshold voltage $V_T$, then the method 1200 proceeds to step 1250, where the feedback circuit adds charge to the sensor electrode (e.g., via a current source). Then, at step 1255, the feedback circuit causes a counter to be decremented.

The method 1200 then proceeds to step 1260, where the processing system 110 determines whether the input sensing period has elapsed. If the input sensing period has not elapsed, then the method 1200 returns to step 1230. If the input sensing period has elapsed, then the method 1200 proceeds to step 1270, where the determination module 250 determines positional information based on the count. Then, at step 1280, the count is reset, and the method 1200 returns to step 1210, where another input sensing signal is driven by the driver module 240.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A method of input sensing with a sensor electrode, the method comprising:
   driving an input sensing signal from a first voltage to a second voltage during a first cycle to charge the sensor electrode;
   repeatedly sampling voltage values associated with the sensor electrode generated in response to driving the input sensing signal during the first cycle;
   repeatedly linearly removing charge from the sensor electrode when the voltage values are above a threshold voltage;
   repeatedly linearly adding charge to the sensor electrode when the voltage values are below the threshold voltage;
   determining a number of times charge is removed from the sensor electrode during the first cycle;
   determining a number of times charge is added to the sensor electrode during the first cycle; and
   determining positional information based on the number of times charge is removed from the sensor electrode and the number of times charge is added to the sensor electrode during the first cycle.

2. The method of claim 1, wherein determining the positional information is performed by subtracting the number of times charge is added to the sensor electrode from the number of times charge is removed from the sensor electrode.

3. The method of claim 1, wherein, for each of the sampled voltage values, charge is either removed from the sensor electrode or added to the sensor electrode.

4. The method of claim 1, wherein sampling the voltage values is performed with a comparator.

5. The method of claim 4, further comprising applying a dither signal to an input of the comparator.

6. The method of claim 1, further comprising removing a baseline amount of charge from the sensor electrode after driving the input sensing signal to charge the sensor electrode.

7. The method of claim 1, wherein repeatedly linearly removing charge from the sensor electrode comprises linearly removing charge from the sensor electrode using a resistive negative feedback network; and repeatedly linearly adding charge to the sensor electrode comprises linearly adding charge to the sensor electrode using a resistive negative feedback network.

8. A processing system for an input device, the processing system comprising:
   a driver module comprising driver circuitry and configured for driving an input sensing signal from a first voltage to a second voltage during a first cycle to charge a sensor electrode;
   a feedback circuit configured for coupling to the sensor electrode, the feedback circuit configured for:
      repeatedly sampling voltage values associated with the sensor electrode generated in response to driving the input sensing signal during the first cycle;
      repeatedly linearly removing charge from the sensor electrode when the voltage values are above a threshold voltage; and
      repeatedly linearly adding charge to the sensor electrode when the voltage values are below the threshold voltage; and
   a determination module configured for:
      determining a number of times charge is removed from the sensor electrode during the first cycle;
      determining a number of times charge is added to the sensor electrode during the first cycle; and
      determining positional information based on the number of times charge is removed from the sensor electrode and the number of times charge is added to the sensor electrode during the first cycle.

9. The processing system of claim 8, wherein determining the positional information is performed by subtracting the number of times charge is added to the sensor electrode from the number of times charge is removed from the sensor electrode.

10. The processing system of claim 8, wherein charge is either removed from the sensor electrode or added to the sensor electrode each time the feedback circuit samples one of the voltage values.

11. The processing system of claim 8, further comprising a dither circuit coupled to the feedback circuit and configured for applying a dither signal to an input of the feedback circuit.

12. The processing system of claim 8, wherein the feedback circuit comprises a comparator.

13. The processing system of claim 8, further comprising:
   an inverter circuit configured for buffering an output of the sensor electrode from an input of the feedback circuit; and
   a reset circuit configured for shorting the output of the sensor electrode to the input of the feedback circuit.

14. The processing system of claim 8, wherein the driver module is configured for coupling to one or more transmitter electrodes and configured for transmitting the input sensing signal via the one or more transmitter electrodes.

15. An input device comprising:
   a sensor electrode; and
   a processing system coupled to the sensor electrode and configured to:

drive an input sensing signal from a first voltage to a second voltage during a first cycle to charge the sensor electrode;
repeatedly sample voltage values associated with the sensor electrode generated in response to driving the input sensing signal during the first cycle;
repeatedly linearly remove charge from the sensor electrode when the voltage values are above a threshold voltage;
repeatedly linearly add charge to the sensor electrode when the voltage values are below the threshold voltage;
determine a number of times charge is removed from the sensor electrode during the first cycle;
determine a number of times charge is removed from the sensor electrode during the first cycle; and
determine positional information based on a number of times charge is removed from the sensor electrode and a number of times charge is added to the sensor electrode during the first cycle.

16. The input device of claim 15, wherein charge is either removed from the sensor electrode or added to the sensor electrode each time the processing system samples one of the voltage values.

17. The input device of claim 15, wherein the processing system is further configured to apply a dither signal to the first voltage.

18. The input device of claim 15, wherein the processing system is further configured to remove a baseline amount of charge from the sensor electrode after driving the input sensing signal to charge the sensor electrode.

19. The input device of claim 15, further comprising one or more transmitter electrodes coupled to the processing system and configured to transmit the input sensing signal.

* * * * *